Aug. 10, 1954 A. E. KONICK 2,686,263
PULSE GENERATOR
Filed April 24, 1952 2 Sheets-Sheet 1

INVENTOR
ARTHUR EDWARD KONICK
BY George Sipkin
B. L. Zangaill
ATTORNEY

INVENTOR
ARTHUR EDWARD KONICK
BY George Lipkin
B. L. Zangaill
ATTORNEY

Patented Aug. 10, 1954 2,686,263

UNITED STATES PATENT OFFICE 2,686,263

PULSE GENERATOR

Arthur E. Konick, Newton Highlands, Mass., assignor, by mesne assignments, to the United States of America as represented by the Secretary of the Navy Application April 24, 1952, Serial No. 284,061

2 Claims. (Cl. 250—27)

This invention relates in general to electrical impulse generator devices and in particular to pulse generators for producing high voltage short duration pulses which are synchronized with the waveform of an alternating current power source.

In many instances where electrical equipment is used it is desired to employ pulse type operation. Typical situations of this type are readily visualized in the fields of radar and many forms of multiplex information transmission systems where signals are emitted in the form of pulses of energy. Where pulses are emitted at a uniform repetition frequency, some form of frequency determining means is required. This frequency determining means may be of several forms depending upon the particular frequency chosen. In some radar systems where the repetition frequency is low, typically 60 cycles per second, synchronization of a self-pulsing radio frequency oscillator to the 60 cycle supply line has been employed. In other instances a separate oscillator operating at the desired repetition frequency is employed. In a third form, a self-pulsing radio frequency oscillator is allowed free-running operation at its normal recurrent frequency. Each of these various forms of frequency stabilization is particularly useful for certain installations, however it is the first form, synchronization to a power supply, that is the primary concern of the present invention.

Synchronization to the power supply has certain distinct advantages. One advantage is a lessening of the power supply filter requirements, since the pulse generator, when thus synchronized, operates always at the same point on the waveform of the supply voltage, power supply filter time constants can be quite small without danger of the introduction of undesired changes into the output generated signals. Additionally, a circuit thus stabilized in frequency does not require an independently operating frequency determining means, itself subject to variations in frequency.

Accordingly it is an object of the present invention to provide a pulse generator circuit of simplified design for producing output pulses synchronized to an input alternating current wave form.

Another object of the present invention is to provide a pulse generator circuit for producing output pulses synchronized to an input alternating current waveform and which does not require an external direct-current power supply.

Another object of the present invention is to provide a pulse generator circuit operative from an alternating current power supply and which does not require large filter condensers.

Figure 1:
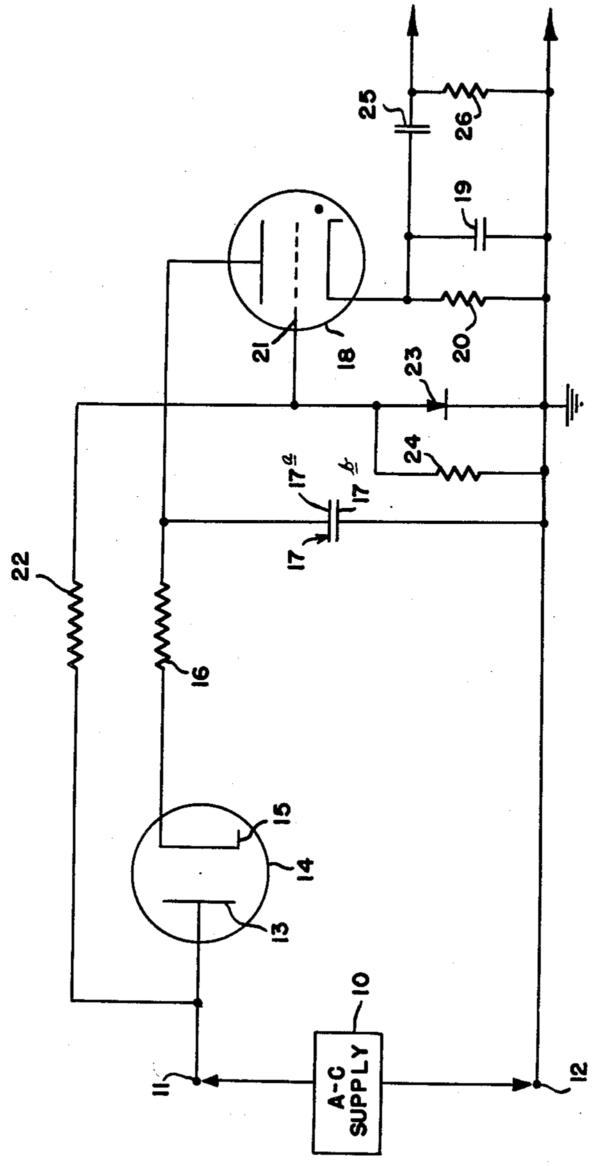
Figure 2A:
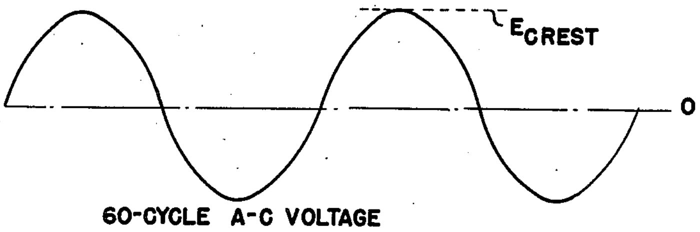
Figure 2B:
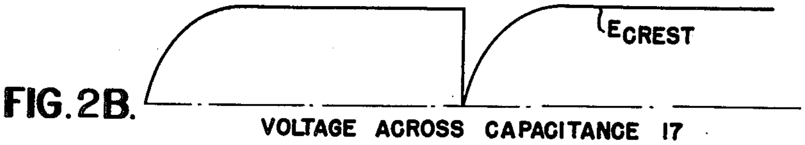
Figure 2C:
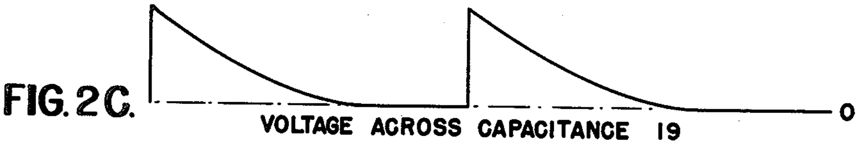
Figure 2D:
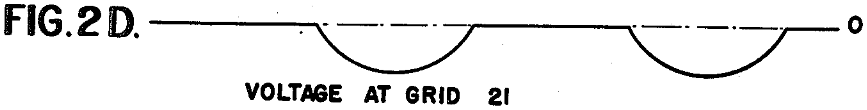
Figure 2E:
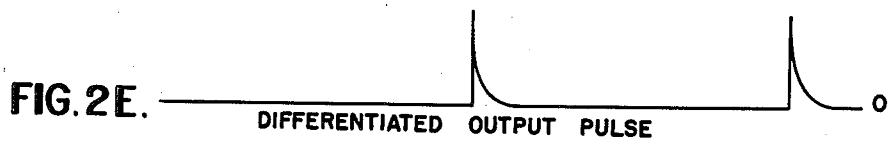

Other and further objects and features will become apparent upon a careful consideration of the following description taken in conjunction with the annexed drawing, wherein Fig. 1 represents in schematic form a typical embodiment of the features of the present invention.

Fig. 2–A shows two cycles of the 60-cycle A.-C. supply voltage.

Fig. 2–B shows voltage variations existent across capacitance 17.

Fig. 2–C shows voltage variations existent across capacitance 19.

Fig. 2–D shows voltage variations at the grid 21.

Fig. 2–E shows differentiated output signals.

With reference now to Fig. 1 of the drawing, a schematic diagram is shown therein of a specific embodiment of the features of the present invention. The circuit shown therein comprises an alternating current power supply 10 which, for example, may supply current at a frequency of 60 cycles per second. Power from supply 10 is applied to the input terminals 11 and 12. Terminal 12 may be considered the "ground" or common return potential. Power supply 10 will normally include a voltage step-up transformer (not shown) which also provides isolation from the line. Input terminal 11 is connected to the anode 13 of a rectifier 14 whose cathode 15 is connected through a current limiting resistance 16 to a filter capacitance 17. Rectifier 14 may be of any suitable type such as a high vacuum, mercury vapor, or even a dry rectifier such as a selenium type. Resistance 16 is essentially a current limiting resistance inserted to limit the peak current drawn through rectifier 14 to a safe value within the ratings of the rectifier.

Connected across capacitance 17 is the anode circuit of gas tube 18 which has in its cathode circuit a capacitance 19 and a resistance 20. The grid 21 of tube 18 is connected to input terminal 11 through resistance 22, which is quite large, typically several megohms. Grid 21 is also connected to ground through a diode rectifier 23 which is shunted by a resistance 24. Rectifier 23 is placed in the circuit with its anode connected to grid 21 and its cathode connected to ground. Thus rectifier 23 becomes conductive during the portions of the supply waveform when terminal 11 is positive with respect to ground and prevents any significant rise in potential of the grid 21 above ground potential. During the portions of the supply waveform wherein terminal 11 is negative with respect to ground, rectifier 23 is non-conductive so that simple voltage divider action takes place between resistances 22 and 24 to supply a fraction of the amplitude of the negative half cycle of the input waveform to the grid 21.

Connected across capacitance 19 is an output coupling circuit comprising capacitance 25 and resistance 26. This output coupling circuit may be in some instances a short time constant circuit to produce differentiation of signals developed across capacitance 19.

The operation of the circuit of Fig. 1 may be briefly described as follows:

Upon application of an A. C. voltage to the terminals 11 and 12, rectifier 14 becomes conductive on positive half cycles to charge capacitance 17 through resistance 16 to the peak value of the A. C. voltage. Electrode 17*a* of capacitance 17 becomes positive with respect to electrode 17*b*, thus a positive potential is applied to the anode of tube 18. In this phase of operation the grid of tube 21 is also held at the ground potential of terminal 12 by diode action of rectifier 23. At this phase, also, it may be assumed that there is no significant potential across capacitance 19. In other words, the cathode of tube 18 is also at the ground potential of terminal 12. Tube 18 is therefore provided with substantially zero grid bias voltage so that it is capable of conducting which it will do to produce a transfer of energy from capacitance 17 to capacitance 19 so that capacitance 19 becomes charged to substantially the same potential as that produced across capacitance 17. When capacitance 19 attains the same potential thereacross as that then existing across capacitance 17, current flow through tube 18 terminates and the tube deionizes. Thereafter further conduction of tube 18 is prevented for a time by the positive potential maintained on the cathode thereof due to the charge on capacitance 19. As is to be expected, however, capacitance 19 will in time discharge through resistance 20 so that the cathode of tube 18 will again approach ground potential. However, the time constant of the circuit of capacitance 19 and resistance 20 is selected such that the cathode of tube 18 will not fall low enough with respect to ground to permit tube 18 to resume conduction, even with the grid 21 at ground potential, until a time has elapsed which is somewhat greater than half the period of the alternating current supply frequency. At this time the terminal 11 will go negative with respect to ground, diode rectifier 23 will cease conducting, and grid 21 will fall negative with respect to terminal 12 to hold tube 18 non-conductive, even with the cathode at ground potential, a condition which prevails until the start of the next positive half cycle of the supply waveform, at which time grid 21 returns to ground potential, and with the cathode then also at substantially ground potential unblocks tube 18 for a repetition of conduction therein. At this instant, which approximately coincides with the instant in time of the start of the positive half cycle and a time at which the potentials of terminals 11 and 12 are equal, diode rectifier 14 is not conductive, however, current for tube 18 is supplied from the energy stored on capacitance 17. Thereafter, during the rising portion of the positive half cycle, capacitance 17 again charges through diode rectifier 14 and resistance 16 until it again attains a peak potential substantially equal to that of the crest value of the A. C. supply.

Operation of the circuit of Fig. 1 may perhaps be more readily visualized through the assistance of waveforms of Figs. 2–A to 2–E wherein Fig. 2–A represents a two cycle portion of the A. C. voltage supplied to terminals 11 and 12. This A. C. voltage when rectified by diode rectifier 14 provides the positive D. C. potential having periodic breaks therein as represented by Fig. 2–B which shows the voltage across capacitance 17. The scale of Fig. 2–B is different from that of Fig. 2–A. These periodic breaks in positive potential across capacitance 17 coincide with the initiation of conduction in tube 18. As energy is transferred from capacitance 17 to capacitance 19 by tube 18, the voltage across capacitance 19 experiences periodic rises coinciding with the periodic breaks in Fig. 2–B. This voltage across capacitance 19 is also shown as including an exponentially decreasing portion following each period of conduction by tube 18.

It is to be understood that the lines in Figs. 2–B and 2–C which represent the fall of voltage across condenser 17 and the rise of voltage across condenser 19 are substantially vertical. However, these lines are actually exponential lines, but the time constants of the circuits involved are so small that the lines appear straight on the scales used in the figures.

As indicated in Fig. 2–C, there is still considerable charge remaining across capacitance 19 at the conclusion of each positive half cycle of the supply voltage. Coinciding with each negative half cycle of the supply voltage a drop in potential is experienced at the grid 21 as shown by the waveform of Fig. 2–D. As indicated by this waveform, the grid 21 possesses substantially zero potential with respect to ground during the positive half cycle of the supply waveform and by virtue of voltage dividing action between resistances 22 and 24 falls to a potential somewhat less than the crest value of the supply voltage during the negative half cycle thereof. Fig. 2–E shows the effect of the coupling circuit of capacitance 25 and resistance 26 when it is of a differentiating character having a shorter discharging time constant than that of the circuit of capacitance 19 and resistance 20. The discharge of capacitance 25 occurs much more rapidly than the discharge of capacitance 19 so that the pulse type waveform produced across resistance 26 is of comparatively short duration, although of substantially the same peak amplitude as that produced across capacitance 19.

These shock pulses indicated in Fig. 2–E are obviously accurately timed by the A.-C. supply voltage on lines 11 and 12, and have the same recurrence rate as the supply voltage. Since they always occur a small fraction of a cycle after a point of inflection of the supply waveform, there is no variation in phasing relative to the supply waveform so that filter requirements are low permitting the use of small filter elements.

In the circuit of Fig. 1 representative values for the various components are as follows:

| | |
|---|---|
| A. C. supply 10 | 440 volts. |
| Rectifier 14 | Type 6 x 4. |
| Gas tube 18 | Type 2D21. |
| Rectifier 23 | Type 1N34 crystal. |
| Resistance 16 | $10^6$ ohms. |
| Resistance 20 | $2\times10^5$ ohms. |
| Resistance 22 | $5.6\times10^6$ ohms. |
| Resistance 24 | $68\times10^3$ ohms. |
| Resistance 26 | $47\times10^3$ ohms. |
| Capacitance 17 | .0073 microfarad. |
| Capacitance 19 | .01 microfarad. |
| Capacitance 25 | .001 microfarad. |

From the above description, it is apparent that many modifications and variations of the present invention are possible. It is therefore to be understood, that within the scope of the appended claims, the invention may be practiced otherwise than as specifically described.

What is claimed is:

1. In combination, an alternating current power source, a first capacitance, rectifier means for charging said first capacitance during alternating current half cycles of a first polarity, a gas tube having at least anode, cathode and grid electrodes for periodically discharging said first capacitance, a time constant circuit including a second capacitance connected to the cathode of said gas tube for receiving the energy discharged by said gas tube and providing cathode bias sufficient to hold said tube non-conductive following each said discharge for a period of time greater than a half period but less than a full period of the alternating current waveform, grid voltage control means for said gas tube including rectifier means connected to said alternating current power source for providing substantially zero grid potential during half cycles of the first polarity and negative grid cut-off potentials during half cycles of opposing polarity, and differentiating output coupling means connected to the second capacitance for providing short duration output pulse signals.

2. In combination, an alternating current power source, a first capacitance, rectifier means for charging said first capacitance during alternating current half cycles of a first polarity, a gas tube having at least anode, cathode and grid electrons for periodically discharging said first capacitance, a time constant circuit including a second capacitance connected to the cathode of said gas tube for receiving the energy discharged by said gas tube and providing cathode bias sufficient to hold said tube non-conductive following each said discharge for a period of time greater than a half period but less than a full period of the alternating current waveform, and grid voltage control means for said gas tube comprising a voltage divider connected to said alternating current power source and including rectifier means for providing substantially zero grid potential during half cycles of the first polarity and negative grid cut-off potentials during half cycles of opposing polarity.

References Cited in the file of this patent

UNITED STATES PATENTS

| Number | Name | Date |
|---|---|---|
| 2,251,973 | Beale et al. | Aug. 12, 1941 |
| 2,284,101 | Robins | May 26, 1942 |
| 2,289,321 | Collom | July 7, 1942 |
| 2,405,575 | Hayes et al. | Aug. 13, 1946 |
| 2,419,340 | Easton | Apr. 22, 1947 |
| 2,508,973 | Smith | May 23, 1950 |

FOREIGN PATENTS

| Number | Country | Date |
|---|---|---|
| 488,842 | Great Britain | July 14, 1938 |